J. D. LONG, D. H. CURRIE & F. SIMPSON.
MACHINE FOR RODENT DESTRUCTION.
APPLICATION FILED DEC. 2, 1912.

1,059,622.

Patented Apr. 22, 1913.

4 SHEETS—SHEET 1.

J. D. LONG, D. H. CURRIE & F. SIMPSON.
MACHINE FOR RODENT DESTRUCTION.
APPLICATION FILED DEC. 2, 1912.

1,059,622.

Patented Apr. 22, 1913.

J. D. LONG, D. H. CURRIE & F. SIMPSON
MACHINE FOR RODENT DESTRUCTION.
APPLICATION FILED DEC. 2, 1912.

1,059,622.

Patented Apr. 22, 1913.
4 SHEETS—SHEET 4.

UNITED STATES PATENT OFFICE.

JOHN D. LONG, DONALD H. CURRIE, AND FRIENCH SIMPSON, OF SAN FRANCISCO, CALIFORNIA.

MACHINE FOR RODENT DESTRUCTION.

1,059,622.  Specification of Letters Patent.  Patented Apr. 22, 1913.

Application filed December 2, 1912.   Serial No. 734,578.

(DEDICATED TO THE PUBLIC.)

*To all whom it may concern:*

Be it known that we, JOHN D. LONG, DONALD H. CURRIE, and FRIENCH SIMPSON, citizens of the United States, residing at 111 New Montgomery Street, in the city and county of San Francisco, State of California, have invented a new and useful Machine for Rodent Destruction; and we hereby state and affirm that this machine, if patent be granted, shall be used by the Government, or any of its officers or employees in prosecution of work for the Government, or by any other person in the United States without payment of any royalty thereon. The following are specifications of herein-named machine.

Our invention relates to improvements in machines for the application of carbon bisulfid vapor for the destruction of rodents that live in burrows. In these machines air is forced with a rotary motion over a small quantity of liquid carbon bisulfid in a closed receptacle and by means of a device for measuring the quantity of liquid, any desired strength of carbon bisulfid may be obtained.

The objects of our improvements are, first: To provide an efficient apparatus for rodent eradication. Second: To provide an apparatus that can be applied during the entire year without regard to season. Third: To provide an apparatus of low cost of construction, maintenance and operation. Fourth: To provide an apparatus of light weight and easy operation.

We attain these objects by the mechanism illustrated in the accompanying drawing, in which—

Figure 1:
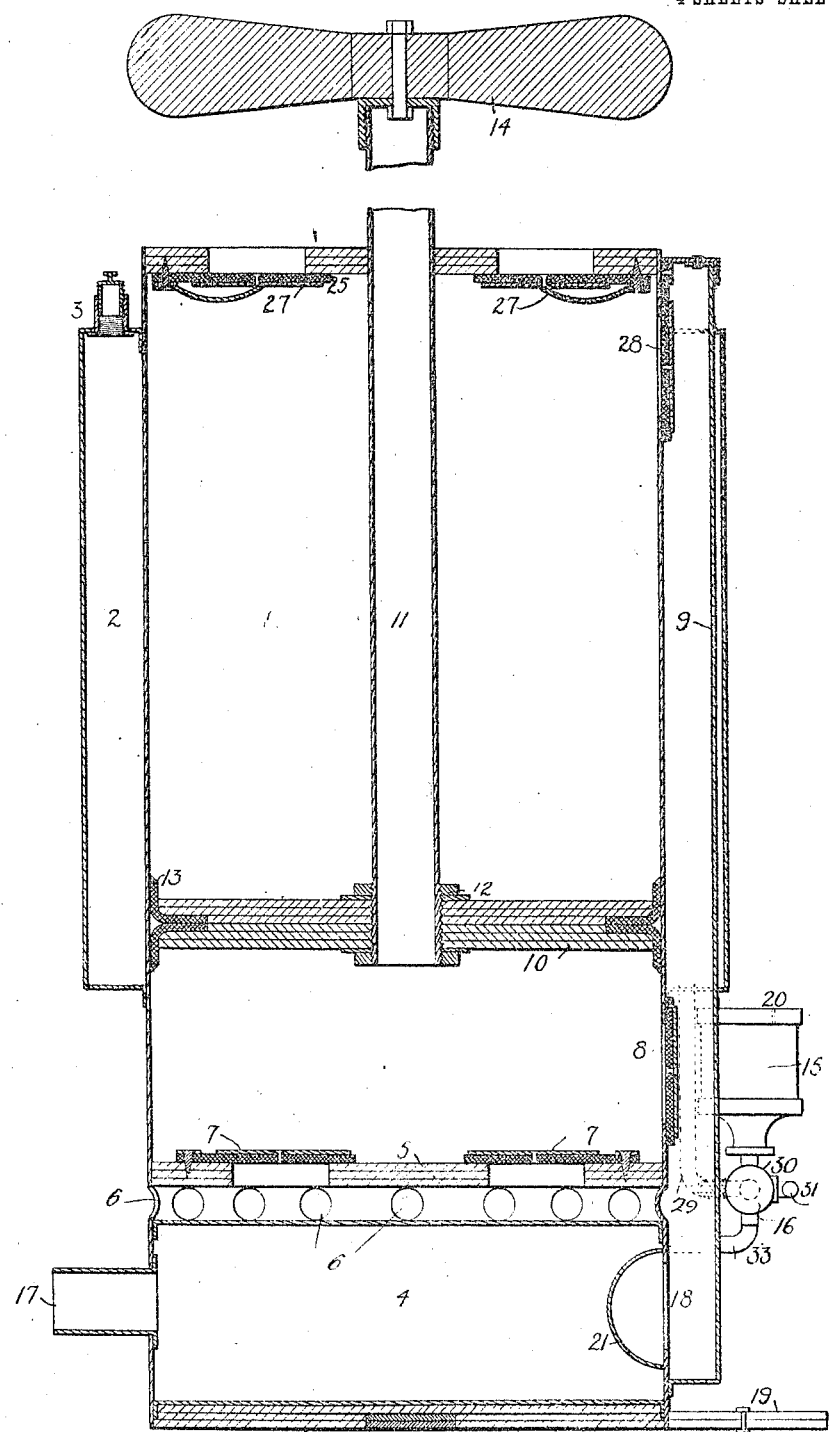
Figure 2:
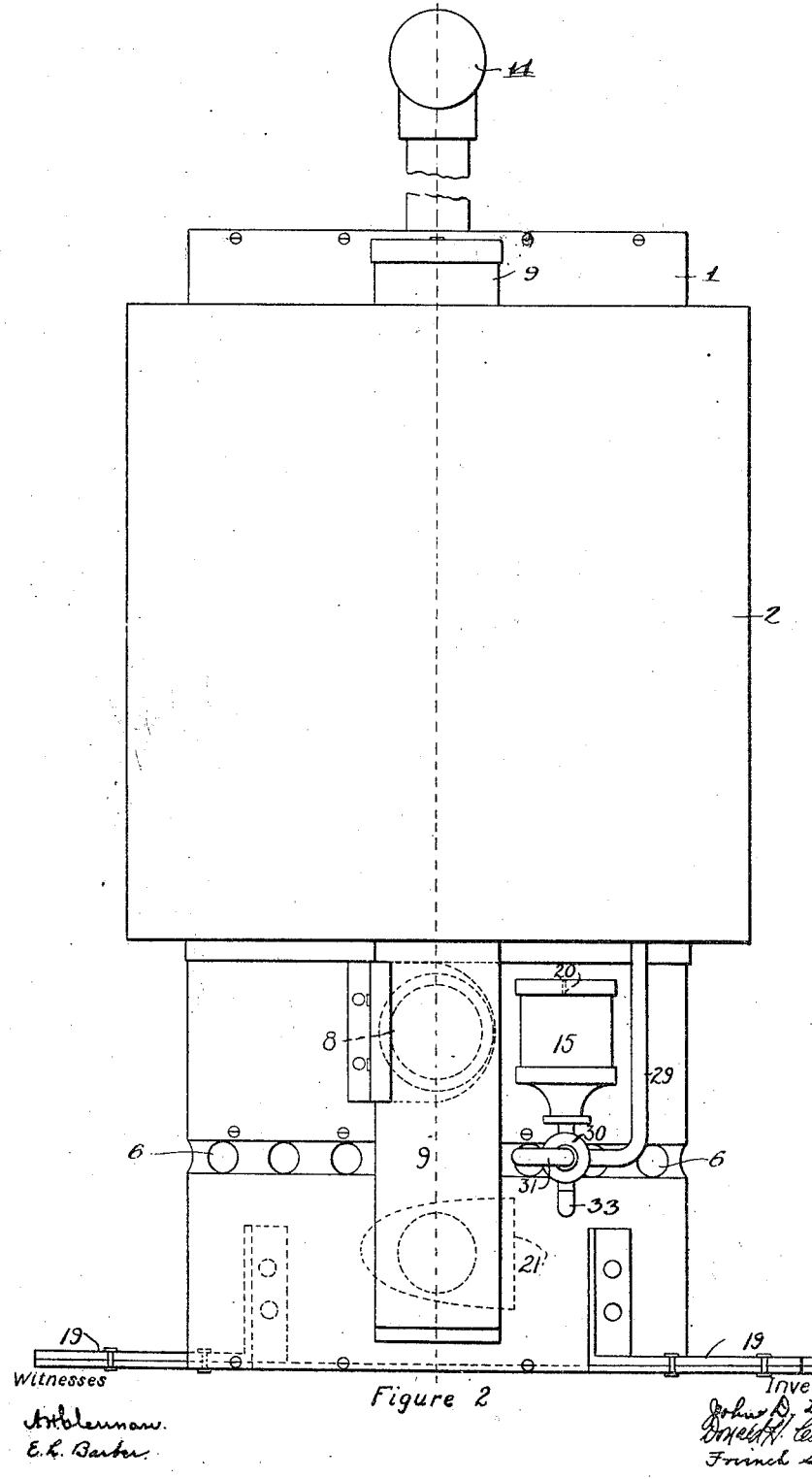
Figure 3:
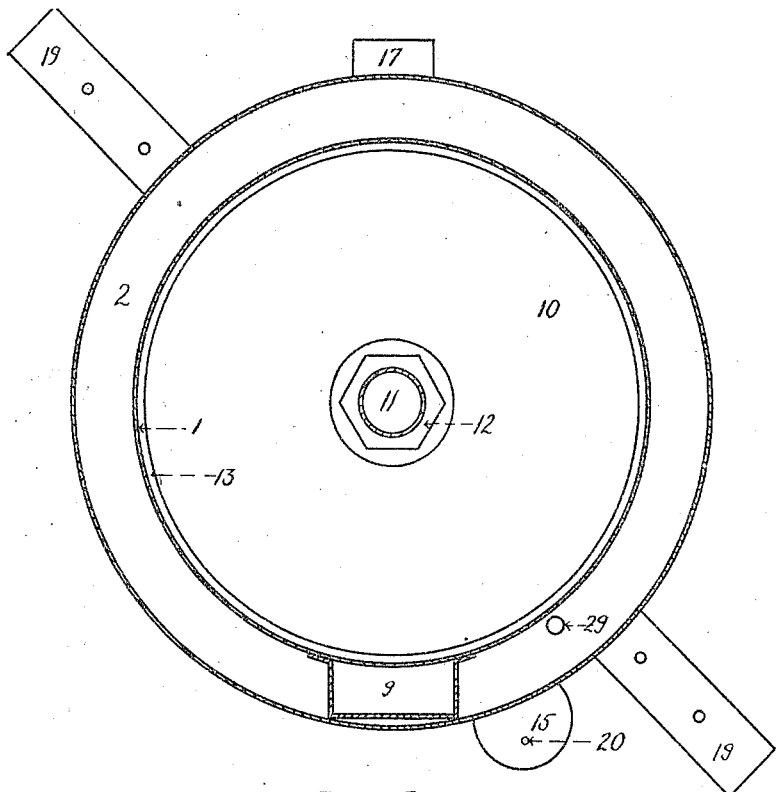
Figure 4:
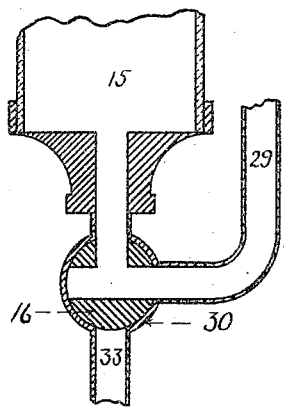
Figure 5:
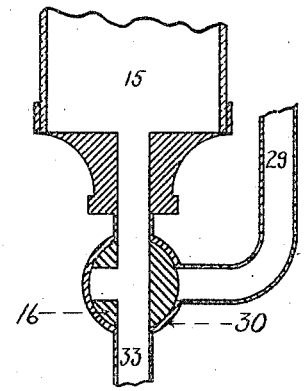
Figure 6:
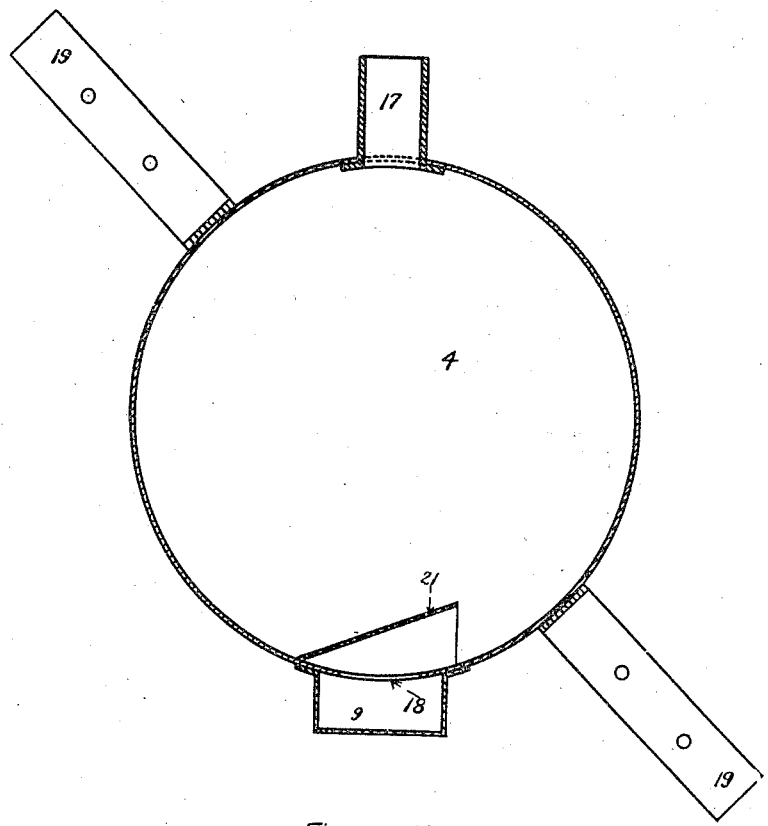

Figure 1 is a vertical section through the entire apparatus; Fig. 2 is an elevation of the entire apparatus; Fig. 3 is a horizontal section through pump chamber 1, annular tank 2, and air passage 9. Fig. 4 is a vertical section through the three-way valve 16 in the position as shown in Fig. 2. Fig. 5 is a vertical section through the three-way valve 16 when the handle extends vertically downward. Fig. 6 is a horizontal section through the apparatus, at the center of the openings 17 and 18 into the vaporizing chamber, through the deflector 21.

The same numerals refer to similar parts throughout the six views.

Referring to the drawing, 1 indicates the cylinder of a pump in which reciprocates a plunger 10 having a plunger stem 11 passing through the top 25 of the cylinder and connected with a handle 14. Said plunger is made air-tight by packing 13, and is held to plunger stem 11 by locknut 12. Said cylinder has at its bottom 5 valved inlets 7 for admitting air entering through holes 6 in an extended wall below the bottom of said cylinder, the air passing between said bottom and the top of a vaporizing chamber 4, and also has valved air-inlets 27 in its top 25. It also has valved air outlets 28 and 8 in its wall close to the top and bottom respectively, said air outlets opening in a rectangular conduit 9. Thus the pump is double acting. The air flowing from the cylinder into said conduit 9 flows from the lower end thereof through an opening 18 into the vaporizing chamber 4, and in order that the air may thoroughly vaporize the bisulfid of carbon furnished thereto, as hereinafter explained, said air is given a rotary motion by means of a deflector 21 extending obliquely from said wall.

Surrounding the pump cylinder is an annular tank 2 having a filling opening 3 and which contains bisulfid of carbon or any other suitable vaporizable liquid. From said tank the liquid flows by a pipe 29 to a valve casing 30, controlled by a three-way valve 16 having a handle 31, and connected with a glass measuring vessel 15 having in its top a small air vent 20. When using the apparatus the operator moves the handle 31 into the horizontal position, as shown in Fig. 2, the liquid then flowing into the vessel 15. When the vessel 15 is full, he then moves the handle into a vertical downwardly extending position, whereupon the liquid flows from the measuring vessel 15 by the pipe 33 into the vaporizing chamber 4. The operator then reciprocates the pump plunger, and vaporizes the bisulfid of carbon in the vaporizing chamber which is then forced through a short spout 17 into a flexible pipe, not shown, the lower end of which extends into the burrow of the rodent or other animal desired to be destroyed. The extended wall of the apparatus, when in operation, is held to the ground by means of iron foot-rests 19, and its bottom is protected by a base-board 22.

We claim:—

The combination of a pump cylinder, a casing forming an annular chamber surrounding said pump, a measuring vessel, a conduit connecting said vessel with the annular chamber, a vaporizing chamber, a conduit connecting said vessel with the vaporizing chamber, a three-way valve controlling said conduits, a conduit leading from the pump to the vaporizing chamber, a deflector extending obliquely from the wall of the vaporizing chamber to direct tangentially the air flowing into said vaporizing chamber, and a spout extending from said vaporizing chamber, with which a hose can be connected.

JOHN D. LONG.
DONALD H. CURRIE.
FRIENCH SIMPSON.

Witnesses:
A. H. GLENNAN,
E. L. BARBER.